(No Model.)

C. A. G. WINTHER.
SOLDERING IMPLEMENT.

No. 300,672. Patented June 17, 1884.

Witnesses
S. N. Piper
E. B. Pratt

Inventor
Charles Adolph Gunther Winther,
by R. W. Eddy att'y.

UNITED STATES PATENT OFFICE.

CHARLES ADOLPH GUNTHER WINTHER, OF BOSTON, MASSACHUSETTS.

SOLDERING IMPLEMENT.

SPECIFICATION forming part of Letters Patent No. 300,672, dated June 17, 1884.

Application filed February 18, 1884. (No model.)

*To all whom it may concern:*

Be it known that I, CHARLES ADOLPH GUNTHER WINTHER, a subject of the Emperor of Germany, and a resident of Boston, in the county of Suffolk, of the Commonwealth of Massachusetts, have invented a new and useful Improvement in Implements for Soldering; and I do hereby declare the same to be described in the following specification and represented in the accompanying drawings, of which—

Figure 1:
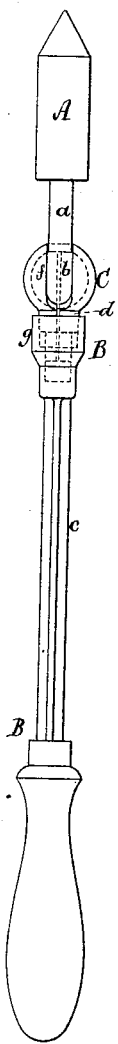
Figure 2:
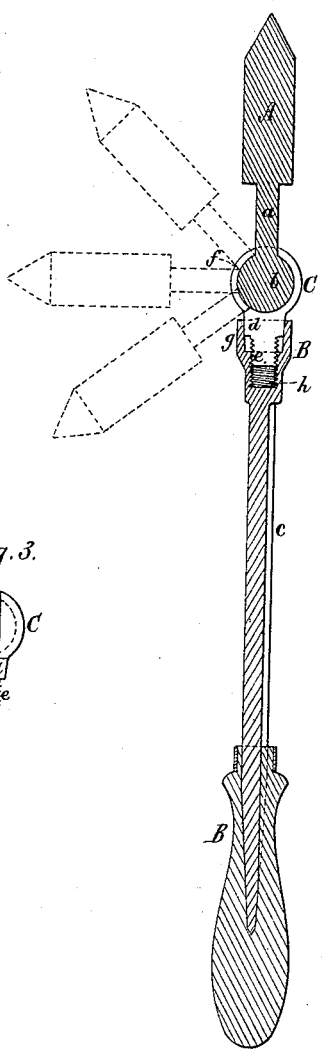
Figure 3:
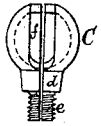

Figure 1 is a side view, and Fig. 2 a longitudinal section, of a soldering implement hereinafter described containing my invention, the nature of which is defined in the claims hereinafter presented. Fig. 3 is a top view of its ball-socket or socketed jaws.

In such drawings, A denotes a soldering-iron, having to the outer end of its shank $a$ a metallic ball or sphere, $b$. A handle, B, provided with a stem, $c$, extending from it, as shown, is furnished with a slotted and spherical socketed head, C, to receive the ball. It also has means of clamping the said head to the ball, the whole being to enable the soldering-iron not only to be revolved, but turned into various angular positions as respects the said stem. The spherical socketed head is shown in the drawings as provided with a cylindrical or tapering neck, $d$, and a male screw, $e$, extending therefrom, such head, neck, and screw being separated lengthwise of them into two equal parts. The head is also slotted on one side of it from its crown to its neck, in manner as shown at $f$, the slot having a width equal to or a little greater than the diameter of the shank of the soldering-iron. The stem $c$ of the handle is provided with a cup, $g$, and a female screw, $h$, extending therefrom, as represented, such female screw being to receive the screw $e$, and with it to crowd the cup $g$ against the neck $d$ in a manner to confine together the two separate parts of the socketed head and clamp them to the ball. As an additional means of clamping the head to the ball, the two parts of the head may not only have ears extended from them, but have a screw to go through one of such ears and screw into the other, so as to draw toward each other and the ball the said parts of the socket or socketed head.

I do not confine my improvement to the mode described of making the ball socket-head and providing it with means of clamping it to the ball, the invention consisting, mainly, in a soldering iron or tool and a handle therefor, having to their shanks a ball-and-socket connection, and means of clamping the socketed piece or head thereof to the ball, such being to enable the soldering-iron to be used in different angular positions relatively to the handle or its stem, and thus save the necessity of a workman, requiring several soldering-irons having their heads immovably fixed to and arranged at different angles with their handles or the shanks thereof.

I claim—

1. The combination of a soldering-iron and a handle having to their shanks a ball-and-socket connection or joint, and means of clamping the socket part thereof to the ball, all being for the purpose substantially as set forth.

2. The handle having to its stem the cup and female screw and the slotted and spherically-socketed head, its neck and screw in two parts, as described, in combination with the soldering-iron having its stem provided with a ball to enter the socket of the said head, all being substantially and for use as represented.

CHARLES ADOLPH GUNTHER WINTHER.

Witnesses:
R. H. EDDY,
S. N. PIPER.